United States Patent [19]

Lawwill

[11] Patent Number: 5,429,380
[45] Date of Patent: Jul. 4, 1995

[54] BICYCLE FRONT SUSPENSION

[76] Inventor: Mert Lawwill, 148 Rockhill Dr., Tiburon, Calif. 94920

[21] Appl. No.: 222,663

[22] Filed: Apr. 4, 1994

Related U.S. Application Data

[63] Continuation-in-part of Ser. No. 762,600, Sep. 19, 1991, Pat. No. 5,299,820.

[51] Int. Cl.$^6$ .............................................. B62K 3/00
[52] U.S. Cl. ...................................... 280/277; 280/280
[58] Field of Search ............... 280/276, 275, 279, 284, 280/280, 277

[56] References Cited

U.S. PATENT DOCUMENTS

| | | | |
|---|---|---|---|
| 1,096,417 | 11/1913 | Ekstrom | 280/277 |
| 2,660,455 | 11/1953 | Douglas et al. | 280/277 |
| 3,954,284 | 5/1976 | Phillips et al. | 280/277 |

FOREIGN PATENT DOCUMENTS

| | | | |
|---|---|---|---|
| 0353990 | 9/1905 | France | 280/277 |
| 0028240 | 1/1925 | France | 280/277 |
| 0972653 | 2/1951 | France | 280/277 |
| 0063758 | 11/1912 | Switzerland | 280/277 |
| 0017291 | 8/1905 | United Kingdom | 280/277 |
| 0026763 | 9/1910 | United Kingdom | 280/277 |

Primary Examiner—Margaret A. Focarino
Assistant Examiner—F. Zeender
Attorney, Agent, or Firm—James E. Eakin; Janet K. Castaneda

[57] ABSTRACT

An improved front suspension for a bicycle includes lower swing arms, upper swing arms and hub plates connected to the front forks in a substantially rhomboidal arrangement, and communicating with a shock absorber through a stabilizer tube, wherein the geometries of the trapezoid are balanced to provide substantially the same trail through the travel of the suspension.

2 Claims, 2 Drawing Sheets

BICYCLE FRONT SUSPENSION

RELATED APPLICATIONS

This application is a continuation-in-part of U.S. patent application Ser. No. 07/762,600 filed on Sep. 19, 1991 U.S. Pat. No. 5,299,820, for a Bicycle Front Suspension.

FIELD OF THE INVENTION

This present invention relates to bicycles, and more particularly relates to bicycles employing suspension means for at least the front wheel.

BACKGROUND OF THE INVENTION

Bicycles have long been used as a means of transportation and recreation. However, until recently, virtually all practical bicycles have involved a relatively rigid frame, which transmits directly to the rider shocks resulting from potholes, rocks or other unevenness in the riding surface. This has resulted in discomfort to the rider which is at the least undesirable, if not unacceptable.

Recently, various bicycles have been introduced which provide some rear suspension, particularly for use with mountain bikes. Mountain bikes, because they are designed for use on rough terrain, are particularly susceptible to problems resulting from encounters with boulders, ditches, ruts, rocks, gravel, and other debris. Bicycles which provide a rear suspension solve a significant portion of the problem, and provide a greatly worthwhile improvement over the conventional, rigid frame mountain bike.

However, there remains a need for a front suspension capable of absorbing shocks while at the same time providing continuous control so that the rider can properly maneuver the bicycle at all times. Two factors figure prominently in the maintenance of control by the rider. The first is stiction, which basically refers to how well the front portion of the frame can absorb shocks. Obviously, a conventional rigid frame has little ability to absorb shocks, and so the rider has to adjust or otherwise accommodate unevenness in the riding surface. The second factor is trail. Trail refers to the distance, measured at the ground, between the center point of the hub of the front wheel, projected perpendicularly onto the ground, and the projection of the center line of the head of the frame along the head angle onto the ground.

The typical solution to this problem found in the prior art has been to include a shock absorber substantially like those provided on motorcycles, although with slightly different damping materials. Such shock absorbers are typically of the telescoping type. One current example of such a product is sold under the trademark "Rock Shox". The difficulty with such designs is that, while they can absorb small shocks, they have limited travel and are more prone to loss of control than is desirable, particularly upon hitting a larger obstacle such as a curb.

Another limitation with prior designs for front suspensions is that trail varies significantly with the amount of travel of the shock. In motorcycles such variation is not necessarily significant to the rider. However, in bicycles, which are much lighter weight than motorcycles, even slight variations—on the order of one-eighth inch—in trail can be detected by experienced riders, and modest variations of as little as one-half inch can make very significant differences. As a result, there has been a need for a bicycle front suspension which provides shock absorption without material variation in trail.

A further limitation with prior designs for front suspensions is that the fork assembly is created using a good amount of hand work and welding. This practice produces a fork structure which has weak points and also makes it difficult to maintain uniformly close tolerances between each front suspension. Further, excessive hand work is costly in terms of manhours and production quantities.

There has therefore been a need for a front suspension for a bicycle which is capable of encountering relatively large obstacles and absorbing the impact caused thereby while at the same time permitting the rider readily to retain control of the bicycle.

SUMMARY OF THE INVENTION

The present invention provides an improved bicycle front fork suspension which resolves many, if not virtually all, of the limitations of the prior art. The present design includes a fork tube having pivot holes at the lower end thereof for connection to a pair of upper and lower swing arms which in turn connect to a hub, or dropout, plate. The hub plate is also connected to a stabilizer tube which drives a shock absorber of a conventional type.

In operation, an impact to the front wheel drives the hub of the wheel upward, which in turn drives the hub plate, stabilizer tube and lower swing arms upward. The stabilizer tube compresses the shock absorber, and the effects of the impact on the rider are significantly reduced.

Importantly, the arrangement of the swing arms maintains the travel of the front wheel substantially along a constant trail distance throughout the range of travel of the front wheel. In this manner, the rider experiences substantially the same sense of control of the bicycle throughout the travel of the front suspension.

In tests, a bicycle having a prototype suspension according to the present invention can be ridden directly into and over a conventional curb with no loss of control or pitching forward of the bicycle.

Further, the entire front fork assembly can be made using machine tools thereby strengthening the fork structure while simultaneously maintaining closer tolerances and reducing costly manhours.

It is therefore one object of the present invention to provide a front suspension for a bicycle which is capable of sustaining significant shocks without loss of control by the rider.

It is another object of the present invention to provide a simple but efficient front suspension for a bicycle which is extremely durable.

It is yet another object of the present invention to provide a front suspension for a bicycle which maintains substantially the same trail throughout the travel of the suspension.

It is still another object of the present invention to provide a front suspension for a bicycle which can be made solely using machine tools thereby maintaining uniformly close tolerances between component parts and simultaneously reducing costly manhours.

These and other objects of the invention will be better understood from the following Detailed Description of the Invention, taken together with the attached Figures.

THE FIGURES

DETAILED DESCRIPTION OF THE INVENTION

This application is a continuation-in-part of U.S. patent application Ser. No. 07/762,600 filed on Sep. 19, 1991 for a Bicycle Front Suspension, incorporated herein by reference.

Figure 1:
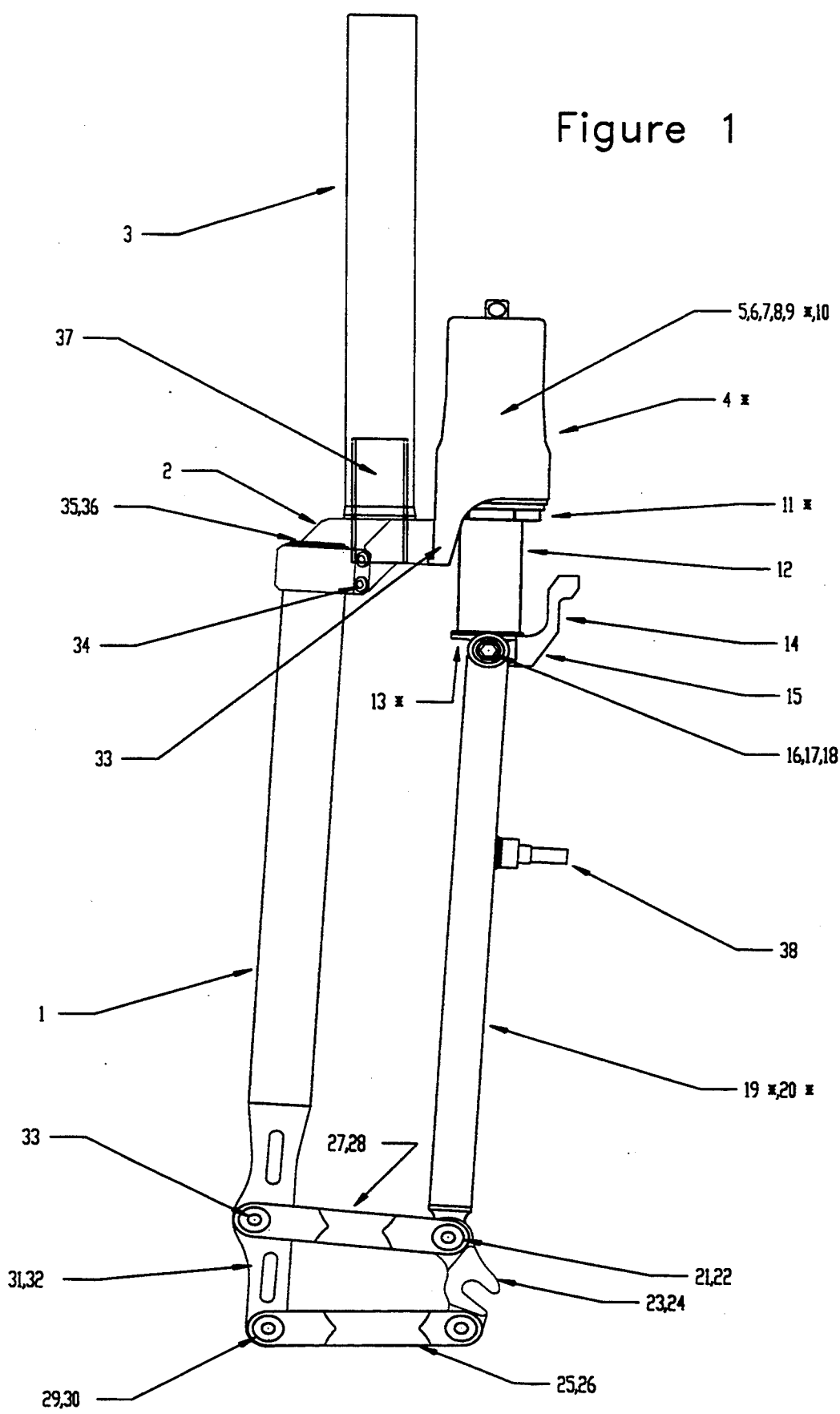
FIG. 1 is a detailed right side view of a front suspension for a bicycle according to the present invention.
Figure 2:
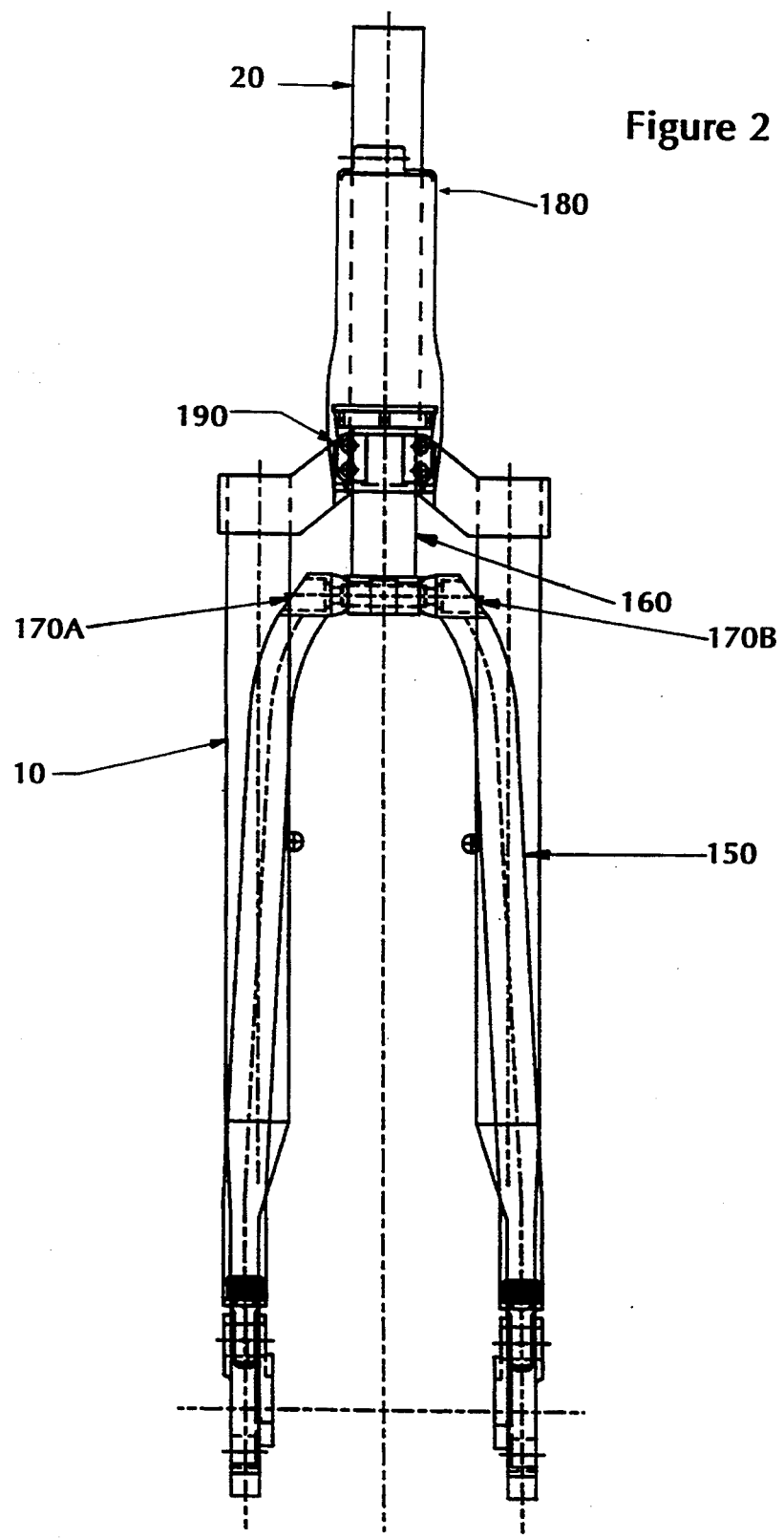
FIG. 2 is a front view of a front suspension for a bicycle according to the present invention.

FIGS. 1 and 2 detail a bicycle front suspension according to the present invention. The bicycle (not shown) includes a conventional frame having a headset integrally formed therewith.

In accordance with the present invention, front forks 10 connect to the frame of the bicycle at the head 20 thereof through the use of an assembly 30 which includes a fork crown 190 and an attached steel sleeve 40. Conventionally, the forks 10 would be retained in position in relation to the head of the bicycle frame with an angle therebetween typically about ten degrees. In accordance with the present invention, however, the front forks 10 are substantially parallel to, but not planarly situated with, the head of the bicycle frame. This geometry is accomplished by connecting the front forks to the back of the fork crown 190. The steel sleeve 40, which is offset from the front forks, is connected substantially perpendicularly to the fork crown and fits within and is connected to the bottom of the fork steerer 20. The fork steerer 20 is then rotatably disposed within the head of the bicycle frame and connected to conventional handle bars at the top of the fork steerer 20. The lower ends 50A and 50B (50B not shown) of the front fork 10 include upper pivot holes 60A-B, respectively, and lower pivot holes 70A-B, respectively.

Pivotably connected to the lower pivot holes 70A-B are the back portion of a pair of lower swing arms 80A-B. The front ends of the lower swing arms are pivotably connected to the lower end of a pair of hub plates 90A-B through a pair of holes 100A-B. A conventional bicycle wheel and tire (not shown) are connected to respective slots 120A-B in the hub plates 90A-B in a conventional manner.

A pair of upper swing arms 130A-B are connected at the forward ends thereof to the hub plate 90A-B through a second pair of holes 140A-B, and connected at the rearward ends thereof to the upper pivot holes 60A-B on the front fork 10. In this improved design, the upper and lower swing arms are substantially the same length and their width has been increased to provide more bearing surface area. This increase in surface area contributes to a longer life for the swing arms.

A stabilizer tube 150 also is connected to the hub plate through a top pair of holes, which may be the same as holes 140A-B as shown in FIG. 1. The stabilizer tube 150 extends upward substantially parallel to the front forks 10. Also at its top, the stabilizer tube 150 rotatably connects a damper shaft 160 through holes 170A-B. The damper shaft 160 pivotably connects to a shock absorber 180, which may be of the gas filled cylinder or polymeric shock absorber type. In a presently preferred embodiment, the shock absorber 180 is connected at its bottom-back side to the front edge of the fork crown 190, in front of and below the head of the bicycle frame. In this manner, shock absorber 180 rotates with the handlebars and forks of the bicycle.

In all instances described herein, pivotable connections between the various arms and tubes may be made in any manner, but typically will be made using conventional bushings and retaining screws threaded into the side of the bushings in a conventional manner.

During operation, an impact received by the front wheel of the bicycle drives the hub of the wheel upward. This causes the hub plates 90A-B to drive upward, in turn causing the lower swing arms 80A-B to rotate about the pivot holes 70A-B and 100A-B, on the front forks 10 and the hub plates 90A-B, respectively. Likewise, the upper swing arms 130A-B rotate about the pivot point formed at the pivot holes 60A-B and 140A-B. The stabilizer tube 150 is driven upward, causing the stabilizer arm 170 to pivot upward as well. The connection at the top of the stabilizer tube 150 to the damper shaft 160 of the shock absorber 180 limits the play in the junction between the stabilizer tube 150 and the shock absorber 180, causing the stabilizer tube 150 to drive upward and compress the shock absorber 180.

Importantly, as the lower swing arms 80A-B rotate upwardly, the hub of the wheel moves slightly backward in an amount limited by the upper swing arms 130A-B. By adjustment of the relative lengths and pivot point positions of the upper swing arms, lower swing arms and hub plate, the hub of the wheel can be maintained at substantially the same trail throughout the range of travel of the suspension as when the suspension is at neutral. By making the upper and lower swing arms substantially the same length, the trail has been increased to approximately 2.5 inches.

In the example shown in FIG. 1, to achieve a trail of approximately 2.5 inches which remains substantially constant throughout the travel of the suspension, the distance between pivot points of the upper swing arms 130A-B is 3.5 inches, the distance between pivot points of the lower swing arms 80A-B is 3.5 inches, the distance from lower holes 100A-B to the slots 120A-B is 0.9 inches, and the distance from the slots 120A-B to the holes 140A-B is 1.2 inches. In such an embodiment, the distance from the second pivot holes 60 to the lower pivot holes 70 is 2.4 inches. It will be appreciated by those skilled in the art that the exemplary geometry provided here is by way of example only, and not by way of limitation. The dimensions provided in the foregoing example can readily be changed to provide substantially the same operation, and in some instances modifications may be desirable to provide a different amount of trail.

Because of the relative shortness of the upper and lower swing arms, and their location forward on the bicycle, the arrangement of FIG. 1 provides very little stiction. This permits the bicycle suspension to absorb substantial shocks without serious risk of loss of control. A prototype bicycle has been shown to be capable of absorbing shocks such as those caused by riding directly into a curb without loss of control when ridden by an experienced rider.

In an alternate embodiment, the stabilizer tube 150 can be modified from the earlier described stabilizer tube 150 to integrally include the hub plates 90A-B of the embodiment of FIG. 1, thus making a rigid connection between the holes 100A-B and the holes 170A-B.

The bicycle front suspension shown in FIG. 1 has many improvements over the suspension disclosed in U.S. application Ser. No. 07/762,600. First, the geometry of the swing arms allows for a substantial increase in rider control because of the significant increase in trail. Further, the geometry of the improved suspension significantly adds to the stiffness and strength of the component parts, as well as to their useful life. For example, the stabilizer bar experiences less distortion at the shock absorber. Further, an increase in the width of the swing arms dramatically improves the strength of the overall design by providing a larger bearing area and thus lasting longer. The swing arms are also now made of glass impregnated plastic, instead of teflon coated steel, which lubricates the bearing better.

The components of the improved structure are all made using machine tools. This also adds to the strength and overall stiffness of the suspension structure by allowing closer and more uniform tolerances between component parts. The machined parts also reduce the amount of time and labor intensive hand work that must be done to fashion the more conventional designs. Lastly, lighter, stronger material, which previously could not be used because of the hand work involved, can be used in the suspension's construction.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is

1. A front suspension for a bicycle, comprising:
   a front wheel with a hub,
   hub plate means wherein the hub of the front wheel is rotatably affixed to the hub plate means, the hub plate means having upper and lower connecting points,
   a front fork,
   swing arm means having forward and rearward ends thereof, the forward end thereof having a first connecting means and the rearward end thereof having a second connecting means, the first connecting means being pivotably connected to the lower connecting points on the hub plate means and the second connecting means being pivotably connected to the front fork,
   control arm means having forward and rearward ends thereof and further having substantially the same length as the swing arm means, the forward end of the control arm means being pivotably connected to the upper connecting points on the hub plate means and the rearward end thereof being pivotably connected to the front fork above the swing arm means,
   coupling means having a first and second end and a handlebar connector means substantially perpendicular to an axis defined by the first and second ends of the coupling means, wherein the front fork is fixedly connected to the first end of the coupling means,
   shock absorber means fixedly connected to the second end of the coupling means, wherein the handlebar connector means is rotatably connected to the bicycle frame so that the front forks are positioned behind a vertical axis defined by a center of the handlebar connector means, and
   stabilizer tube means having upper and lower ends and pivotably connected to the hub plate means at the lower end and the shock absorber means at the upper end.

2. A front suspension for a bicycle, comprising:
   a front wheel with a hub,
   a pair of hub plate means wherein the hub of the front wheel is rotatably affixed at either side to one of the hub plate means, each hub plate means having upper and lower connecting points,
   coupling means having a first and second end and a handlebar connector means being substantially perpendicular to the axis defined by the first and second ends of the coupling means,
   a front fork connected to the first end of the coupling means,
   a first pair of swing arm means having forward and rearward ends thereof, the forward ends thereof having a first connecting means and the rearward end thereof having a second connecting means, the first connecting means being pivotably connected to the lower connecting points on each hub plate and the second connecting means being pivotably connected to the front fork,
   a second pair of swing arm means having a length which is substantially the same as the first pair of swing arm means, the second pair of swing arm means further having forward and rearward ends thereof, the forward ends of the second pair of swing arm means having a first connecting means and the rearward ends of the second pair of swing arm means having a second connecting means, the first connecting means of the second pair of swing arm means being pivotably connected to the upper connecting points on each hub plate and the second connecting means of the second pair of swing arm means being pivotably connected to the front fork above the first pair of swing arm means,
   shock absorber means fixedly attached to the second end of the coupling means, wherein the handlebar connector means is rotatably connected to the bicycle frame so that the front forks are positioned behind a vertical axis defined by a center of the handlebar connector means,
   a pair of stabilizer tube means having upper and lower ends and pivotably connected to the respective pair of hub plate means at the lower ends and the shock absorber means at the upper ends.

* * * * *